United States Patent
Kho et al.

(10) Patent No.: US 11,463,930 B2
(45) Date of Patent: Oct. 4, 2022

(54) APPARATUS AND METHOD FOR SWITCHING WIRELESS ACCESS TECHNOLOGY IN WIRELESS COMMUNICATION SYSTEM

(71) Applicant: Samsung Electronics Co., Ltd., Suwon-si (KR)

(72) Inventors: Youngsung Kho, Suwon-si (KR); Jaehyun Hwang, Suwon-si (KR); Joonseo Lee, Suwon-si (KR); Moonyoung Jeong, Suwon-si (KR); Kyuho Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 19 days.

(21) Appl. No.: 16/978,648

(22) PCT Filed: Mar. 6, 2019

(86) PCT No.: PCT/KR2019/002563
§ 371 (c)(1),
(2) Date: Sep. 4, 2020

(87) PCT Pub. No.: WO2019/172629
PCT Pub. Date: Sep. 12, 2019

(65) Prior Publication Data
US 2021/0007026 A1    Jan. 7, 2021

(30) Foreign Application Priority Data
Mar. 8, 2018  (KR) .................. 10-2018-0027576

(51) Int. Cl.
*H04W 4/00*     (2018.01)
*H04W 36/14*    (2009.01)
(Continued)

(52) U.S. Cl.
CPC ............ *H04W 36/14* (2013.01); *H04W 36/12* (2013.01); *H04W 36/30* (2013.01); *H04W 88/18* (2013.01)

(58) Field of Classification Search
CPC ..... H04W 36/14; H04W 36/12; H04W 36/30; H04W 88/18
(Continued)

(56) References Cited

U.S. PATENT DOCUMENTS 8,391,918 B2 * 3/2013 Ekici ................... H04W 48/18
455/574
9,479,984 B2 * 10/2016 Olofsson ........... H04W 36/0079
(Continued)

FOREIGN PATENT DOCUMENTS

FR      2984669 A1    6/2013
KR   10-2015-0021276 A   3/2015
(Continued)

OTHER PUBLICATIONS

International Search Report and Written Opinion of the International Searching Authority in connection with International Application No. PCT/KR2019/002563 dated Jun. 13, 2019, 10 pages.
(Continued)

*Primary Examiner* — Amancio Gonzalez

(57) ABSTRACT

The present disclosure relates to a pre-$5^{th}$-Generation (5G) or 5G communication system to be provided for supporting higher data rates beyond $4^{th}$-Generation (4G) communication system such as long-term evolution (LTE). Disclosed is radio access technology (RAT) switching in a wireless communication system, and an operating method of a server for managing a session comprises the steps of: receiving information related to a determination on the switching of a RAT; determining, on the basis of the information, whether the RAT for providing a service to a terminal is switched (Continued)

from a first RAT to a second RAT; and transmitting, to an object for processing a user plan, a message indicating that a data route of the terminal will be switched from the first RAT to the second RAT.

20 Claims, 15 Drawing Sheets

(51) Int. Cl.
  *H04W 36/12* (2009.01)
  *H04W 36/30* (2009.01)
  *H04W 88/18* (2009.01)

(58) Field of Classification Search
  USPC .......................................................... 370/331
  See application file for complete search history.

(56) References Cited

U.S. PATENT DOCUMENTS

| | | | |
|---|---|---|---|
| 10,419,961 B2* | 9/2019 | Lee | H04W 36/30 |
| 10,419,979 B2* | 9/2019 | Youn | H04L 63/0869 |
| 10,455,459 B2* | 10/2019 | Hahn | H04W 36/0011 |
| 11,006,355 B2* | 5/2021 | Iyer | H04W 48/00 |
| 11,109,280 B2* | 8/2021 | Youn | H04L 63/0272 |
| 11,184,057 B2* | 11/2021 | Jung | H04B 7/0617 |
| 11,184,838 B2* | 11/2021 | Park | H04W 48/16 |
| 2003/0125028 A1 | 7/2003 | Reynolds | |
| 2006/0025151 A1 | 2/2006 | Karaoguz et al. | |
| 2011/0038322 A1 | 2/2011 | Liang | |
| 2013/0165108 A1* | 6/2013 | Xu | H04W 24/00 455/423 |
| 2015/0036512 A1* | 2/2015 | Xu | H04W 24/10 370/242 |
| 2016/0044545 A1* | 2/2016 | Yang | H04W 36/0022 370/331 |
| 2016/0142956 A1* | 5/2016 | Wang | H04W 24/02 370/221 |
| 2016/0205606 A1 | 7/2016 | Park et al. | |
| 2016/0234751 A1* | 8/2016 | Golaup | H04W 36/30 |
| 2018/0270679 A1* | 9/2018 | Laselva | H04W 48/18 |
| 2018/0302834 A1 | 10/2018 | Zhang et al. | |
| 2019/0230554 A1 | 7/2019 | Kang et al. | |
| 2019/0364541 A1 | 11/2019 | Ryu | |
| 2020/0280901 A1* | 9/2020 | Na | H04W 76/15 |
| 2021/0352521 A1* | 11/2021 | Pan | H04W 76/12 |

FOREIGN PATENT DOCUMENTS

| | | |
|---|---|---|
| KR | 10-2018-0006841 A | 1/2018 |
| KR | 10-2018-0013862 A | 2/2018 |
| WO | 2018008980 A1 | 1/2018 |

OTHER PUBLICATIONS

3GPP TS 23.501 V15.0.0 (Dec. 2017), Technical Specification, 3rd Generation Partnership Project; Technical Specification Group Services and System Aspects; System Architecture for the 5G System; Stage 2 (Release 15), Dec. 2017, 181 pages.

Office Action dated Nov. 11, 2021 in connection with Korean Patent Application No. 10-2018-0027576, 9 pages.

"3rd Generation Partnership Project; Technical Specification Group Services and System Aspects; Study on Access Traffic Steering, Switching and Splitting support in the 5G system architecture (Release 16)", 3GPP TR 23.793 V0.2.0 (Jan. 2018), 18 pages.

Notice of Preliminary Rejection dated May 24, 2022 in connection with Korean Patent Application No. 10-2018-0027576, 11 pages.

* cited by examiner

APPARATUS AND METHOD FOR SWITCHING WIRELESS ACCESS TECHNOLOGY IN WIRELESS COMMUNICATION SYSTEM

CROSS-REFERENCE TO RELATED APPLICATIONS

This application is a 371 National Stage of International Application No. PCT/KR2019/002563, filed Mar. 6, 2019, which claims priority to Korean Patent Application No. 10-2018-0027576, filed Mar. 8, 2018, the disclosures of which are herein incorporated by reference in their entirety.

BACKGROUND

1. Field

The disclosure generally relates to a wireless communication system and, more particularly, to an apparatus and method for switching radio access technology (RAT) in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'beyond 4G network' or a 'post long term evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In general, the introduction of a new system causes the retirement of the existing system. However, in reality, the transition of a system requires a transition period. Therefore, in a process of introducing the proposed 5G system, it is expected that the existing 4G system such as LTE/LTE-A and the 5G system will coexist for a certain period of time. In this case, if a terminal selectively uses an appropriate radio access technology (RAT) among the 4G system and the 5G system, a more effective service can be provided.

SUMMARY

Therefore, the disclosure has been made in view of the above-mentioned problems, and an aspect of the disclosure is to provide an apparatus and method for providing effective services using different radio access technologies (RATs) in a wireless communication system.

In addition, another aspect of the disclosure is to provide an apparatus and method for performing efficient switching between different RATs in a wireless communication system.

In addition, another aspect of the disclosure is to provide an apparatus and method for supporting switching of a core-initiated RAT in a wireless communication system.

In addition, another aspect of the disclosure is to provide an apparatus and method for supporting switching of user equipment (UE)-initiated RAT in a UE in a wireless communication system.

According to various embodiments of the disclosure, a method of operating a server for managing a session in a wireless communication system may include: receiving information related to determination of switching of a radio access technology (RAT); determining whether to switch a RAT for providing a service to a terminal from a first RAT to a second RAT based on the information; and transmitting a message instructing to switch a data path of the terminal from the first RAT to the second RAT to an object processing a user plane.

According to various embodiments of the disclosure, a method of operating a terminal in a wireless communication system may include: determining whether to switch a RAT for a service provided through a first RAT to a second RAT; and transmitting a packet including a request for the switching, wherein the packet may be generated by configuring at least one of a plurality of fields included in a header to a predefined value or inserting a predefined bit pattern to at least a portion of a payload.

According to various embodiments of the disclosure, a server device for managing a session in a wireless communication system may include: a transceiver configured to transmit and receive a signal; and at least one processor configured to be connected to the transceiver, wherein the at least one processor may receive information related to determination of switching of a RAT, may determine whether to switch a RAT for providing a service to a terminal from a first RAT to a second RAT based on the information, and may transmit a message instructing to switch a data path of the terminal from the first RAT to the second RAT to an object processing a user plane.

According to various embodiments of the disclosure, a terminal device in a wireless communication system may include: a transceiver configured to transmit and receive a signal; and at least one processor configured to be connected to the transceiver, wherein the at least one processor may determine whether to switch a RAT for a service provided through a first RAT to a second RAT and may control to transmit a packet including a request for the switching, and the packet may be generated by configuring at least one of a plurality of fields included in a header to a predefined value or inserting a predefined bit pattern to at least a portion of a payload.

An apparatus and method according to various embodiments of the disclosure may support switching between different radio access technologies (RATs), thereby efficiently providing a service in an environment accessible to a plurality of RATs.

Effects obtainable from the disclosure may not be limited to the above mentioned effects, and other effects which are not mentioned may be clearly understood, through the following descriptions, by those skilled in the art to which the disclosure pertains.

DETAILED DESCRIPTION

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

Hereinafter, the disclosure relates to an apparatus and method for supporting switching between different radio access technologies (RATs) in a wireless communication system. Specifically, the disclosure describes techniques for performing core-initiated RAT switching or UE-initiated RAT switching in a wireless communication system.

In the following description, a term referring to a signal, a term referring to a channel, a term referring to a unit of a logical resource, a term referring to control information, a term referring to network entities, a term referring to a component of a device, and the like are exemplified for convenience of description. Therefore, the disclosure is not limited to the terms described below, and other terms having equivalent technical meanings may be used.

In addition, the disclosure describes various embodiments using terms used in some communication standards (e.g., 3rd generation partnership project (3GPP)), but this is only an example for explanation. Various embodiments of the disclosure can be easily modified and applied in other communication systems.

Figure 1:
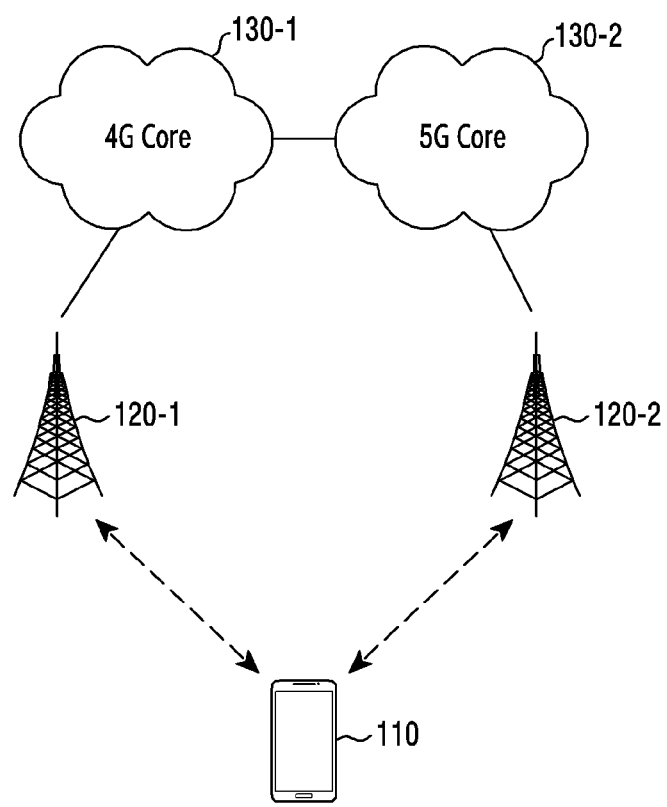
FIG. 1 illustrates a wireless communication system according to various embodiments of the disclosure.

FIG. 1 illustrates a wireless communication system according to various embodiments of the disclosure. FIG. 1 illustrates a terminal 110, a base station 120-1, and a base station 120-2 as some of nodes that use a radio channel in a wireless communication system.

The terminal 110 is a device used by a user, and performs communication with the base station 120-1 and the base station 120-2 through a radio channel. In some cases, at least one of the terminals 110 may be operated without user intervention. That is, at least one of the terminals 110 is a device that performs machine type communication (MTC) and may not be carried by a user. The terminal 110 may be referred to as a "user equipment (UE)", a "mobile station", a "subscriber station", a "remote terminal", a "wireless terminal", or a "user device", or other terms having equivalent technical meanings.

The base station 120-1 and the base station 120-2 are network infrastructures that provide wireless access to the terminal 110. Each of the base station 120-1 and the base station 120-2 has coverage defined as a constant geographic area based on a distance capable of transmitting a signal. Each of the base station 120-1 and the base station 120-2 may be referred to as an 'access point (AP)', a 'wireless point', a 'transmission/reception point (TRP)', or other terms having equivalent technical meanings. Here, the base station 120-1 operates according to the specifications of a 4th generation (4G) system (e.g., long term evolution (LTE) or LTE-advanced (LTE-A)), and may be referred to as an eNodeB (eNB)'. In addition, the base station 120-2 operates according to the specifications of a 5th generation (5G) system, and may be referred to as a 'next generation nodeB (gNB)' or a 5th generation node (5G node)'.

The terminal 110, the base station 120-1, and the base station 120-2 may transmit and receive a radio signal in a millimeter wave (mmWave) band (e.g., 28 GHz, 30 GHz, 38 GHz, or 60 GHz). At this time, in order to improve the channel gain, the base station 120-1, the base station 120-2, and the terminal 110 may perform beamforming. Here, beamforming may include transmission beamforming and reception beamforming. That is, the base station 120-1, the base station 120-2, and the terminal 110 may impart directivity to a transmission signal or a reception signal. To this end, the base station 120-1, the base station 120-2, and the terminal 110 may select serving beams 112, 113, 121, and 131 through a beam search or beam management procedure. After the serving beams 112, 113, 121, and 131 are selected, subsequent communication may be performed through a resource having a quasi co-located (QCL) relationship with a resource that has transmitted the serving beams 112, 113, 121, and 131.

If large-scale characteristics of a channel that has transmitted a symbol on a first antenna port can be inferred from a channel that has transmitted a symbol on a second antenna port, the first antenna port and the second antenna port may be evaluated to have a QCL relationship therebetween. For example, the large-scale characteristics include at least one of delay spread, Doppler spread, Doppler shift, average gain, average delay, and spatial receiver parameter.

A 4G core 130-1 is a core network for a 4G system, and a 5G core 130-2 is a core network for a 5G system. The 4G core 130-1 provides functions for communication between terminals connected to the 4G system and an external network (e.g., an Internet protocol (IP) network). The 5G core 130-2 provides functions for communication between terminals connected to the 5G system and an external network (e.g., an IP network). Each of the 4G core 130-1 and the 5G core 130-2 may include a plurality of entities, and the names and functions of objects may be variously defined according to the requirements and design of each system. According to various embodiments, the 4G core 130-1 and the 5G core 130-2 may have a structure capable of interworking. Accordingly, the terminal 110 can perform RAT switching between the 4G system and the 5G system. Here, RAT switching is an operation of changing a serving node from an access node (e.g., a base station) supporting a first RAT to an access node supporting a second RAT, such as 'link switching', 'link technology switching', 'path switching', or other terms having equivalent technical meanings.

The 5G system is expected to use broadband resources in a high frequency band. Accordingly, the 5G system is expected to be able to provide services at a high transmission rate, but the initial 5G system may have the following instability. In a case in which a technique such as beamforming is applied for high-speed data transmission, when line-of-sight (LOS) between a base station and a terminal is not guaranteed and a non-LOS (NLOS) environment is created, there is a possibility that the performance deteriorates instantly or a radio link failure (RLF) in which a link is broken occurs. For example, when the direction of the terminal is suddenly changed, or when an obstacle such as a truck passes between the terminal and the base station, RLF may occur. In addition, in a situation where the cell coverage of the 5G system is small or before the 5G systems are installed in the national network, there may be many 5G shaded areas.

Therefore, for stable data services, as illustrated in FIG. 1, many operators are considering a scenario in which the 4G system and the 5G system interwork. For example, a method of providing services through a 4G system outside the 5G service area and providing services through a 5G base station (e.g., the base station 120-2) when the terminal enters the 5G service area is being considered. In addition, if the terminal is out of the 5G service area while receiving data through 5G, a method of naturally handing over to the 4G system is also being considered. That is, various structures and procedures for interworking between the 4G system and the 5G system have been newly studied.

The interworking structure between 4G and 5G currently being discussed is basically of a non-standalone (NSA) type, which is a structure in which 5G connection cannot be made independently and relies on an existing 4G infrastructure. In addition, a 4G and 5G interworking structure based on standalone (SA) is also being discussed, and this is a method of defining anchor for interworking in a core and interworking the 4G and 5G systems at a core level. In this case, the terminal may perform a dual registration by transmitting a separate attach request to each of the 4G system and the 5G system, and may then selectively use one system depending on the situation or use both systems together.

In relation to the above-described interworking between the systems, 3GPP, which is a standard organization, is proposing a study on user plane (UP) traffic steering and switch of a terminal using new radio (LTE/NR) dual radio. The following <Table 1> is a part of the contents of the related study item (SI).

TABLE 1

Title: Study on Access Traffic Steering and Switch support between LTE and NR
Acronym: FS_ATSS_LTE_NR
" . . . This SID focuses on standalone deployment scenarios only(i.e. no Xn connection between LTE and NR), including following two scenarios:
Scenario 1: LTE access node and NR access node are connected to EPC and 5GC respectively. That is, 5GS-EPS interworking in the standalone configuration.
Scenario 2: LTE access node and NR access node are connected to a single 5GC in the standalone configuration (i.e., option 5 and option 2).
This SID addresses (only) Dual Radio UE that simultaneous use the 2 radio: LTE and NR.

In order to interwork multiple RATs, that is, multiple access/link technologies, a problem of selecting which RAT to be used at arbitrary point in time must be solved. The criteria for the selection can be defined based on user preferences, rates, policies, etc., for a specific RAT. As another major criterion, the channel condition of a radio link can be considered. If it is difficult to provide a desired level of quality of service (QoS) due to a significantly poor channel condition of the radio link of the current terminal, it is desirable to switch to another replaceable RAT.

Determination for the RAT switching may be performed by a terminal or a network side (e.g., a base station or an object in a core network). However, in the case of core-level interworking, that is, in the case of SA-based interworking structure, it is difficult for the core to know the channel state of a radio section in real time, so that there is an opinion that a subject of the decision for switching should be a UE. Therefore, both a direction of discussion of standardization and a direction of development of vendors are concentrated on UE-initiated switching.

However, the UE-initiated switching scheme has some problems. First, in order to perform switching, the terminal needs to transmit a signaling message for switching to the core. This may act as an overhead causing additional traffic between the terminal and the core, and as a result, a delay time may be generated between the switching decision time and the execution time. Second, when sudden RLF occurs while using 5G, it must be able to fall back to 4G quickly. Here, if the connection of the 4G system is in an idle state at the time of a switching attempt, a service request or paging operation must be performed for a wakeup operation. That is, due to the occurrence of an additional time delay, a negative effect is generated on the user experience. Finally, even if a signaling message is immediately transmitted to the core after a radio problem of a link is detected, there is a significantly high possibility that data already transmitted to the base station is lost. If a procedure such as a service request is performed, the amount of data to be lost will be greater. As the easiest solution to minimize the impact of at least some of the above-mentioned problems, a 4G interface is always active while using 5G. However, such a solution shortens the battery use time of the terminal, and may cause waste of 4G radio resources that are not used.

Accordingly, the disclosure proposes a core-initiated switching technique. According to various embodiments, in a core-level interworking structure, at least one object in the core network may receive information related to a radio channel state from a base station and may control RAT switching. Specifically, various embodiments are related to a method of determining a RAT to be switched according to the reception of the information related to the radio channel state from the base station, an operation on an idle state of the RAT to be switched, a linkage scheme with UE-initiated switching, and the like.

According to various embodiments, signaling for transmitting information related to a radio channel state between a radio access network (RAN) and a core is used. In this regard, the following notification control technology can be used. Notification control indicates whether notifications are required from the RAN when a guaranteed flow bit rate (GRBR) can no longer (or again) be fulfilled for a QoS flow during the lifetime of the QoS flow. If, for a given guaranteed bit rate (GBR) QoS flow, notification control is enabled and the RAN determines that the GFBR cannot be fulfilled, the RAN may send a notification to a session management function (SMF). That is, when the RAN determines that a QoS for a specific flow is not fulfilled, a notification is transmitted to a core (e.g., SMF). The RAN may keep the QoS flow and should try to fulfill the GFRB. Upon receiving the notification indicating that the GFBR cannot be fulfilled from the RAN, the 5G core may initiate N2 signaling to modify or remove the QoS flow. Once the condition is improved and the GFBR is fulfilled again, the RAN may send a new notification to inform the SMF that the GFBR can be fulfilled again. After the configured time, the RAN may send a subsequent notification indicating that the GFBR cannot be fulfilled.

As described above, the notification from the RAN on whether the QoS is satisfied may be transmitted when the GFBR cannot be fulfilled and when the channel condition is improved and then the GFBR is fulfilled again. In addition, in order to prevent frequent signaling, when the condition becomes worse again and additional transmission of the notification is needed, the notification is transmitted after a pre-configured time. Therefore, the load rise of the RAN due to the notification control will not be large.

As described above, a procedure for confirming the channel condition of the radio section in the core is required for the core-initiated switching, and the above-described notification control technique can be used for this. Accordingly, according to various embodiments, when a notification message transmitted by the RAN is received by the core, the core may control to switch from the used RAT to another RAT based on the received notification message, current traffic conditions, and the like.

Figure 2:
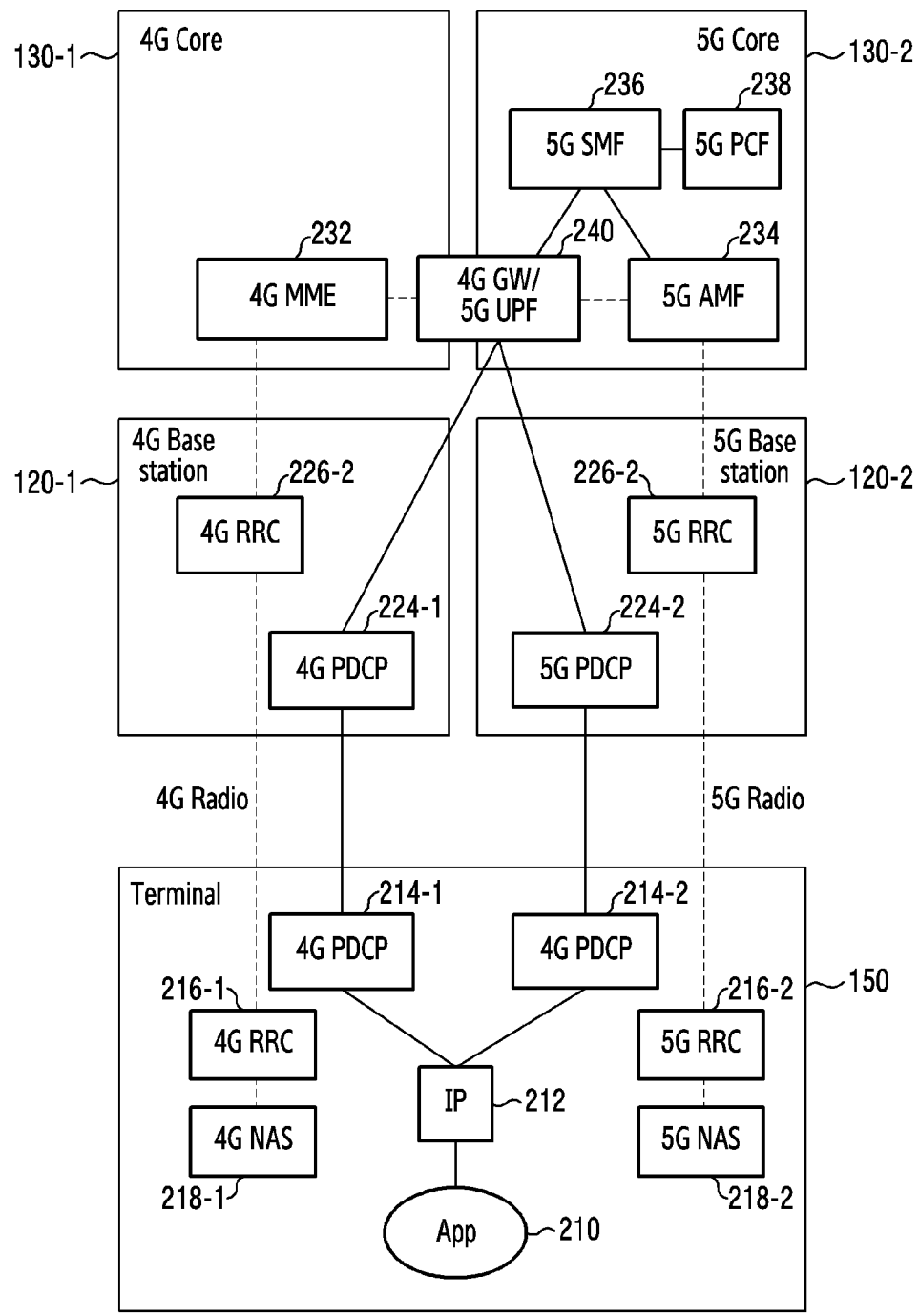
FIG. 2 illustrates a structure for interworking between radio access technologies (RATs) in a wireless communication system according to various embodiments of the disclosure.

FIG. 2 illustrates a structure for interworking between RATs in a wireless communication system according to various embodiments of the disclosure. FIG. 2 illustrates a specific example of objects included in each core network and some protocol layers of a terminal and a base station in the structure of the system illustrated in FIG. 1.

Referring to FIG. 2, the terminal 110 includes an application (APP) layer 210 and an IP layer 212. To use a 4G system, the terminal 110 includes a 4G packet data convergence protocol (PDCP) layer 214-1, a 4G radio resource control (RRC) layer 216-1, and a 4G non-access stratum (NAS) layer 218-1. In addition, to use a 5G system, the terminal 110 includes a 5G PDCP layer 214-2, a 5G RRC layer 216-2, and a 5G NAS layer 218-2. The base station 120-1 is included in the RAN of the 4G system, and includes a 4G PDCP layer 224-1 and a 4G RRC layer 226-1. The base station 120-2 is included in the RAN of the 5G system, and includes a 5G PDCP layer 224-2 and a 5G RRC layer 226-2. The 4G core 130-1 includes a mobility management entity (MME) 232, and the 5G core 130-2 includes a 5G access and mobility management function (AMF) 234, a 5G SMF 236, and a 5G policy control function (PCF) 238. As an anchor for interworking between the 4G core 130-1 and the 5G core 130-2, a 4G gateway (GW)/5G user plane function (UPF) 240 is defined.

Each of the objects included in the 5G core 130-2 illustrated in FIG. 2 may be implemented with hardware designed exclusively for the corresponding function, or may be implemented by installing software for the corresponding function in a general-purpose server. Accordingly, the objects may be implemented as separate devices, or two or more objects may be implemented as a single device.

The IP layer 212 of the terminal 110 may be connected to the 4G PDCP layer 214-1 and the 5G PDCP layer 214-2 for data processing. That is, in order to transmit and receive data through the 4G system, the 4G PDCP layer 214-1 may interwork with the 4G PDCP layer 224-1 of the base station 120-1. To transmit and receive data through the 5G system, a connection to the 5G PDCP layer 214-2 may be made. According to various embodiments, switching between the 4G system and the 5G system may be performed, and by the switching, the IP layer 212 may interwork with any one of the 4G PDCP layer 214-1 and the 5G PDCP layer 214-2. Although not illustrated in FIG. 2, for data transmission and reception through the 5G system, the terminal 110 may further include a service data adaptation protocol (SDAP).

The 4G RRC layer 216-1 may process control signaling with the base station 120-1 of the 4G system, and for this purpose, the 4G RRC layer 216-1 may interwork with the 4G RRC layer 226-1 of the base station 120-1. The 5G RRC layer 216-2 may process control signaling with the base station 120-2 of the 5G system, and for this purpose, the 5G RRC layer 216-2 may interwork with the 5G RRC layer 226-2 of the base station 120-2. In addition, the 4G NAS layer 218-1 may process control signaling with the 4G core 130-1, and for this purpose, the 4G NAS layer 218-1 may interwork with the MME 232 in the 4G core 130-1. The 5G NAS layer 218-2 may process control signaling with the 5G core 130-2, and for this purpose, the 5G NAS layer 218-2 may interwork with the 5G AMF 234 in the 5G core 130-2.

The 4G MME 232 manages mobility in the 4G system. For example, the 4G MME 232 controls the handover, location update, and operation mode (e.g., idle mode) of the terminal 110. The 5G AMF 234 is an RAN-side termination of a control plane (CP) in the 5G system, and controls registration management, connection management, mobility management, access authentication/authorization, etc., as the end of the NAS layer. The 5G SMF 236 performs management (e.g., establishment, modification, release, etc.) of a session, tunnel maintenance between a UPF and an access network (AN) node, and assignment and maintenance of IP addresses. The 5G PCF 238 may support an unified policy framework, may provide policy rules to the control plane, and may access subscription information related to policy decisions in an unified data repository (UDR).

The 4G GW/5G UPF 240 is an object that combines a gateway (e.g., at least one of a packet data network gateway (P-GW) and a serving gateway (S-GW)) for processing data in the 4G system and the UPF for processing data in the 5G system. The 4G GW/5G UPF 240 provides functions for interworking between the 4G core 130-1 and the 5G core 130-2. That is, the 4G GW/5G UPF 240 is an anchor for interworking between the 4G core 130-1 and the 5G core 130-2, and can control a data path between an external network (e.g., an IP network) and each of a 4G access network and a 5G access network. When the terminal 110 is serviced through the 4G system, the 4G GW/5G UPF 240 configures the data path with the PDCP layer 224-1 of the base station 120-1. On the other hand, when the terminal 110 is serviced through the 5G system, the 4G GW/5G UPF 240 configures the data path with the PDCP layer 224-2 of the base station 120-2. In the case of FIG. 2, the 4G GW and the 5G UPF are exemplified as one object, but according to another embodiment, the 4G GW is configured as one object, and the 5G UPF is configured as another object and may be defined as an interoperable structure.

According to the structure shown in FIG. 2, the 4G GW/5G UPF 240 is defined as an anchor node for interworking in the core. The structure illustrated in FIG. 2 is a dual registration structure in which the terminal 110 is individually connected to the 4G core 130-1 and the 5G core 130-2. According to various embodiments, the 5G SMF 236 in the 5G core 130-2 may have a function for receiving QoS related information from the base station and transmitting a command for switching to the 4G GW/5G UPF 240. To this end, although not shown in FIG. 2, an interface for transmitting QoS information in the RAN, such as a QoS notification message between the base station 130-2 and the SMF 236, may be defined. That is, the 4G GW/5G UPF 240 can perform RAT switching from the 5G system to the 4G system under the control of the 5G SMF 236. More detailed structure and operations of the SMF 236 for this are described below.

Figure 3:
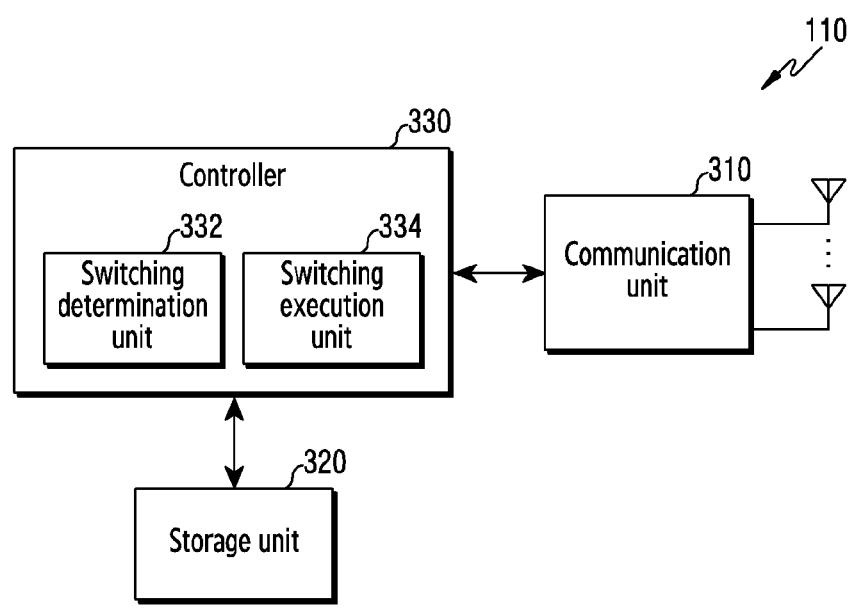
FIG. 3 illustrates components of a terminal in a wireless communication system according to various embodiments of the disclosure.

FIG. 3 illustrates components of a terminal in a wireless communication system according to various embodiments of the disclosure. The components illustrated in FIG. 3 may be understood as the components of the terminal 110. Terms such as ' . . . unit' ' . . . -er (-or)', etc., used below may refer to a unit that processes at least one function or operation, which may be implemented by hardware or software, or a combination of hardware and software.

Referring to FIG. 3, the terminal includes a communication unit 310, a storage unit 320, and a controller 330.

The communication unit 310 performs functions for transmitting and receiving signals through a wireless channel. For example, the communication unit 310 performs a conversion function between a baseband signal and a bit string according to a physical layer standard of the system. For example, during data transmission, the communication unit 310 generates complex symbols by encoding and modulating a transmission bit string. In addition, during data reception, the communication unit 310 restores the received bit string through demodulation and decoding of the baseband signal. In addition, the communication unit 310 up-converts the baseband signal to a radio frequency (RF) band signal, transmits the RF band signal through an antenna, and down-converts the RF band signal received through the antenna to a baseband signal. For example, the communication unit 310 may include a transmission filter, a reception filter, an amplifier, a mixer, an oscillator, a digital to analog convertor (DAC), and an analog to digital converter (ADC).

In addition, the communication unit 310 may include a plurality of transmission/reception paths. Furthermore, the communication unit 310 may include at least one antenna array composed of a plurality of antenna elements. In terms of hardware, the communication unit 310 may be composed of a digital circuit and an analog circuit (e.g., a radio frequency integrated circuit (RFIC)). Here, the digital circuit and the analog circuit may be implemented in one package. Also, the communication unit 310 may include a plurality of RF chains. Furthermore, the communication unit 310 may perform beamforming. In addition, the communication unit 310 may include different communication modules to process signals of different frequency bands. Furthermore, the communication unit 310 may include a plurality of communication modules to support a plurality of different RATs. For example, different radio access technologies may include 4G systems and 5G systems.

The communication unit 310 transmits and receives signals as described above. Accordingly, all or a portion of the communication unit 310 may be referred to as a 'transmitter, a 'receiver', or a 'transceiver'. In addition, in the following description, transmission and reception performed through a radio channel are used in a sense including the above-described processing performed by the communication unit 310.

The storage unit 320 stores data such as a basic program, an application program, and configuration information for the operation of the terminal. The storage unit 320 may be composed of a volatile memory, a nonvolatile memory, or a combination of the volatile memory and the nonvolatile memory. The storage unit 320 provides the stored data according to a request of the controller 330.

The controller 330 controls overall operations of the terminal. For example, the controller 330 transmits and receives signals through the communication unit 310. In addition, the controller 330 records and reads data in the storage unit 320. In addition, the controller 330 may perform functions of a protocol stack required by the communication standard. To this end, the controller 330 may include at least one processor or microprocessor, or may be a portion of the processor. Also, a portion of the communication unit 310 and the controller 330 may be referred to as a communication processor (CP).

According to various embodiments, the controller 330 may include a switching determination unit 332 that determines whether to perform RAT switching based on at least one of information on a radio channel, information on traffic processing, and information on preference, and a switching execution unit 334 that executes an operation (e.g., generating a control message or the like) for performing RAT switching. Here, the switching determination unit 332 and the switching execution unit 334 may be instruction sets or codes stored in the storage unit 330, and may be instructions/codes at least temporarily residing in the controller 330, a storage space in which the instructions/codes are stored, or a portion of a circuitry constituting the controller 230. According to various embodiments, the controller 330 may control the switching determination unit 332 and the switching execution unit 334 and other components to perform RAT switching. For example, the controller 330 may control the terminal to perform operations according to various embodiments described below.

Figure 4:
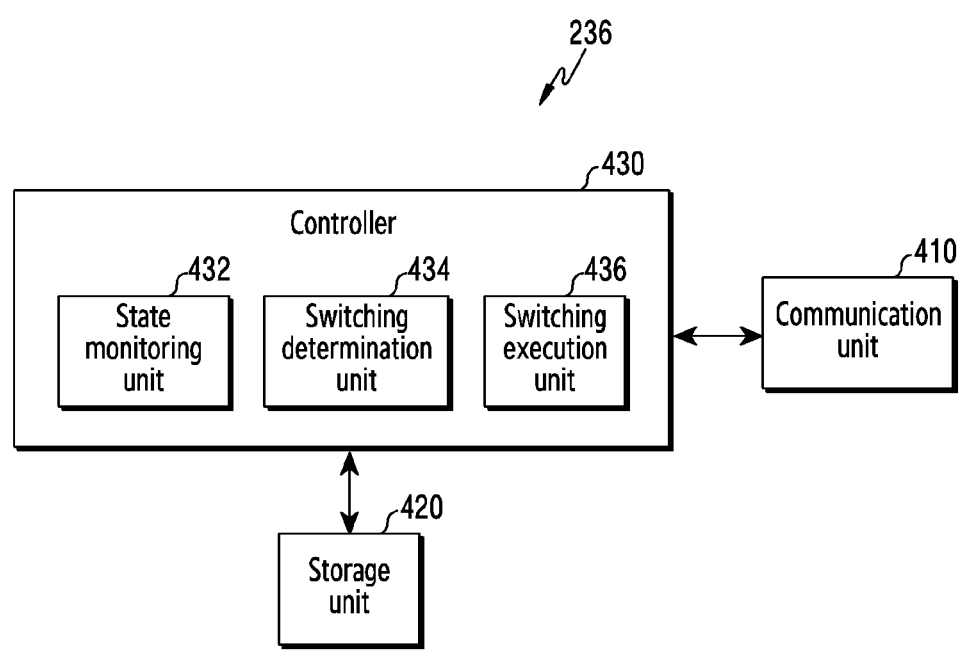
FIG. 4 illustrates components of a server that manages a session in a wireless communication system according to various embodiments of the disclosure.

FIG. 4 illustrates components of a server that manages a session in a wireless communication system according to various embodiments of the disclosure. The component illustrated in FIG. 4 is one of objects included in the 5G core 130-2, and may be understood as, for example, a component of a device performing the function of the SMF 236. Terms such as ' . . . unit' ' . . . -er (-or)', etc., used below may refer to a unit that processes at least one function or operation, which may be implemented by hardware or software, or a combination of hardware and software.

Referring to FIG. 4, the server includes a communication unit 410, a storage unit 420, and a controller 430.

The communication unit 410 provides an interface for communicating with other objects in a network. That is, the communication unit 410 converts a bit string, which is transmitted from the server to another object, for example, GW/UPF, AMF, PCF, or the like, into a physical signal, and converts the physical signal received from another node into a bit string. That is, the communication unit 410 may transmit and receive signals. Accordingly, the communication unit 410 may be referred to as a modem, a transmitter, a receiver, or a transceiver. At this time, the communication unit 410 allows the server to communicate with other devices or systems through a backhaul connection (e.g., a wired backhaul or a wireless backhaul) or through a network.

The storage unit 420 stores data such as a basic program, an application program, and configuration information for the operation of the server. Also, the storage unit 420 provides the stored data according to a request of the controller 430.

The controller 430 controls overall operations of the server. For example, the controller 430 transmits and receives signals through the communication unit 410. In addition, the controller 430 records and reads data in the storage unit 420. To this end, the controller 430 may include at least one processor. According to various embodiments, the controller 430 may include a state monitoring unit 432 configured to collect information that affects the determination of RAT switching, a switching determination unit 434 configured to determine whether to perform RAT switching based on information on a radio channel, information on traffic processing, information on a connection state, and information on preferences, and a switching execution unit 436 configured to execute an operation (e.g., generating a control message or the like) for performing RAT switching. Here, the state monitoring unit 432, the switching determination unit 434, and the switching execution unit 436 may be instruction sets or codes stored in the storage unit 420, and may be instructions/codes at least temporarily residing in the controller 430, a storage space in which the instructions/codes are stored, or a portion of a circuitry constituting the controller 443.

According to various embodiments, the controller 430 may control the state monitoring unit 432, the switching determination unit 434, and the switching execution unit 436 and other components to execute RAT switching. For example, the controller 430 may control the server to perform operations according to various embodiments described below.

Figure 5:
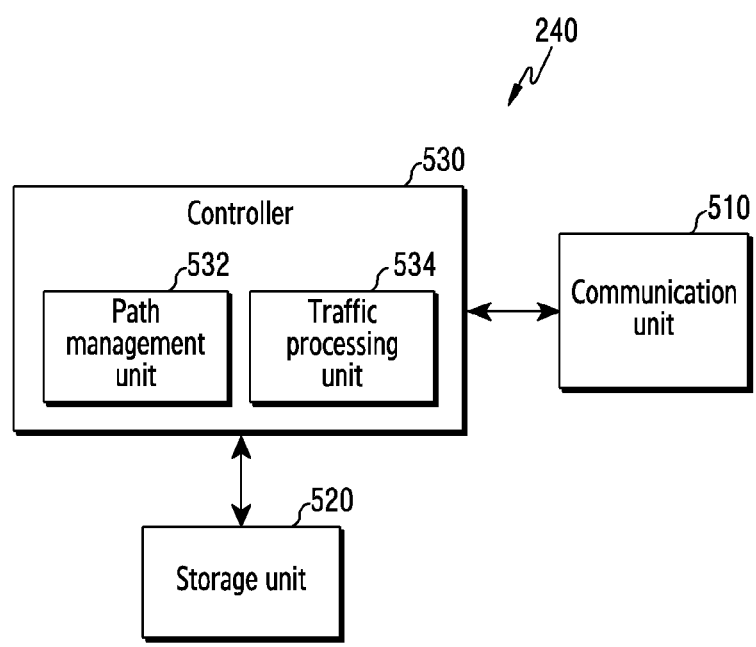
FIG. 5 illustrates components of a server that manages a user plane (UP) in a wireless communication system according to various embodiments of the disclosure.

FIG. 5 illustrates components of a server that manages a user plane (UP) in a wireless communication system according to various embodiments of the disclosure. The component illustrated in FIG. 5 is one of objects included in the 5G core 130-2, and may be understood as, for example, a component of a device performing the function of the 4G GW/5G UPF 240. Terms such as ' . . . unit' ' . . . -er (-or)', etc., used below may refer to a unit that processes at least one function or operation, which may be implemented by hardware or software, or a combination of hardware and software.

Referring to FIG. 5, the server includes a communication unit 510, a storage unit 520, and a controller 530.

The communication unit 510 provides an interface for communicating with other objects in a network. That is, the communication unit 510 converts a bit string, which is transmitted from the server to another object, for example, SMF, AMF, PCF, or the like, into a physical signal, and converts the physical signal received from another node into a bit string. That is, the communication unit 510 may transmit and receive signals. Accordingly, the communication unit 510 may be referred to as a modem, a transmitter, a receiver, or a transceiver. At this time, the communication unit 510 allows the server to communicate with other devices or systems through a backhaul connection (e.g., a wired backhaul or a wireless backhaul) or a network.

The storage unit 520 stores data such as a basic program, an application program, or configuration information, for the operation of the server. Also, the storage unit 520 provides the stored data according to a request of the control unit 530.

The controller 530 controls overall operations of the server. For example, the controller 530 transmits and receives a signal through the communication unit 510. In addition, the controller 530 records and reads data in the storage unit 520. To this end, the controller 530 may include at least one processor. According to various embodiments, the controller 530 may include a path management unit 532 configured to control a function for switching a data path between different RATs, and a traffic processing unit 534 configured to configure a data path in any one RAT and processes a packet transmitted through the configured data path. Here, the path management unit 532 and the traffic processing unit 534 may be instruction sets or codes stored in the storage unit 520, and may be instructions/codes at least temporarily residing in the controller 530, a storage space in which the instructions/codes are stored, or a portion of a circuitry constituting the controller 534.

According to various embodiments, the controller 530 may control the path management unit 532, the traffic processing unit 534, and other components to perform RAT switching. For example, the controller 530 may control the server to perform operations according to various embodiments described below.

Figure 6:
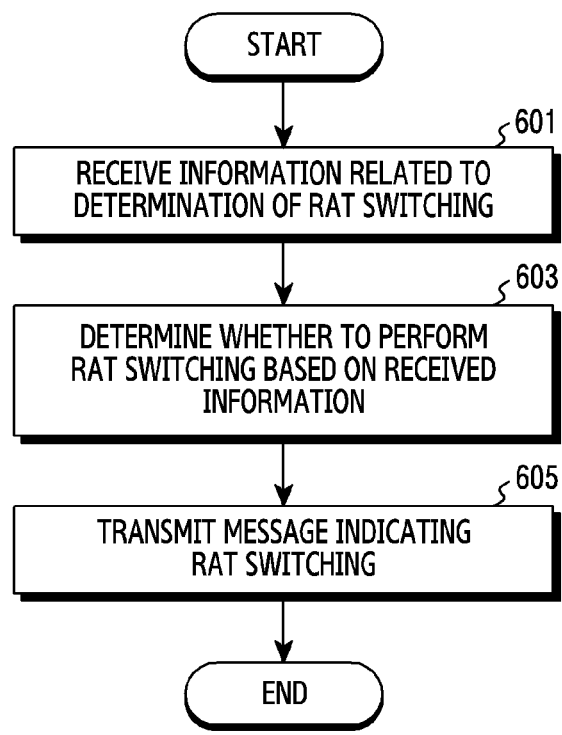
FIG. 6 is a flowchart illustrating the operation of a server that manages a session in a wireless communication system according to various embodiments of the disclosure.

FIG. 6 is a flowchart illustrating the operation of a server that manages a session in a wireless communication system according to various embodiments of the disclosure. FIG. 6 illustrates an operation method of an apparatus performing the function of the SMF 236.

Referring to FIG. 6, in operation 601, the server receives information related to determination of RAT switching. The information related to the determination of the RAT switching is information that affects the determination of whether the RAT is switched, and may be provided from a base station, a terminal, or another core network object. For example, the information related to the determination of the RAT switching may include at least one of information on the state of the radio link of the terminal, information on a preferred RAT for each service, information on a connection state of the terminal, and a request for RAT switching determined by another object. That is, the server may receive a notification message on whether QoS is satisfied from a base station or the like, may receive state information of the link from the outside, or may manage availability information of the link based on attach/detach request information of the terminal.

In operation 603, the server determines whether to perform RAT switching based on the received information. A specific operation of determining whether to perform RAT switching depends on the information received in operation 601. For example, the server may determine whether to perform switching based on link state information, predefined network slice/session-specific policies, and service-specific preference information. At this time, the server may determine the switching of all services/slices/sessions/flows of the corresponding terminal, or the switching of some services/slices/sessions/flows.

In operation 605, the server transmits a message indicating RAT switching. Since the RAT switching is an operation of changing a data path from a first RAT to a second RAT, a message is transmitted to an object that controls the data path. That is, the server transmits a message requesting RAT switching to an object (e.g., the 4G GW/5G UPF 240) that controls the user plane of the terminals. In other words, the server commands RAT switching to the object that controls the user plane. The message may include at least one of identification information of the terminal, identification information of the service/slice/session/flow to be switched, and identification information of the RAT to be switched.

According to the embodiment described with reference to FIG. 6, the server may operate to perform RAT switching. Although not illustrated in FIG. 6, the RAT switching may be determined and performed in a state of being connected to a plurality of RATs (e.g., the 4G system and the 5G system). That is, at the first time when the terminal is connected to the network, the terminal has a single connection with any one of the RATs. In this case, data can be transmitted and received through the path of the RAT that is connected and configured first. Thereafter, an additional connection to another RAT is made, so that whether to perform switching may be determined when the connection to the plurality of RATs is made.

In a situation in which switching from the first RAT to the second RAT is determined, when the state of the second RAT is an idle state, a paging procedure for changing the state of the terminal for the second RAT may be required. That is, if the state of the terminal for the RAT to be switched is an idle state, a paging operation and downlink inband packet transmission may be performed. At this time, in order to prevent data from being transmitted through the first RAT, it is preferable that switching is performed first and then the paging procedure is performed.

Hereinafter, various embodiments of determining RAT switching according to information to be used will be described.

Figure 7:
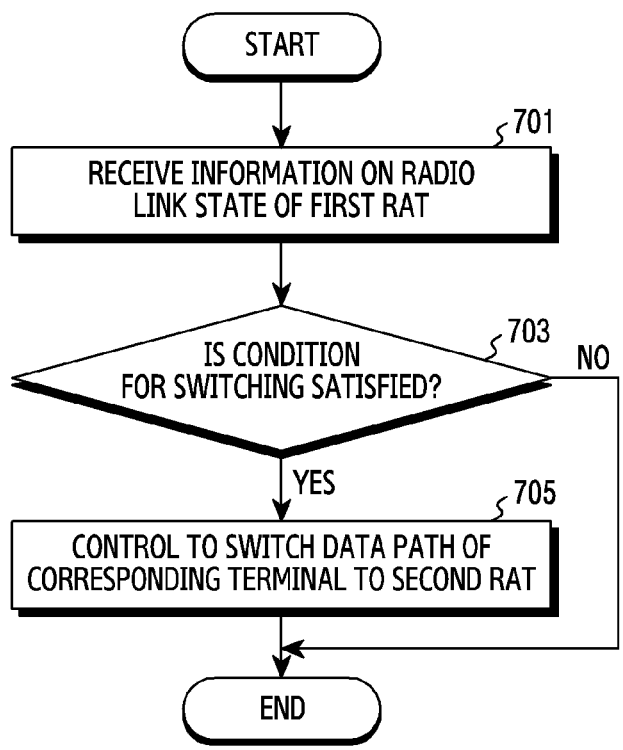
FIG. 7 is a flowchart illustrating switching based on wireless link information of a server that manages a session in a wireless communication system according to various embodiments of the disclosure.

FIG. 7 is a flowchart illustrating switching based on wireless link information of a server that manages a session in a wireless communication system according to various embodiments of the disclosure. FIG. 7 is an operation method of an apparatus performing the function of the SMF 236, and illustrates a case of determining whether to perform switching based on information on a radio link provided by an RAN.

Referring to FIG. 7, in operation 701, the server receives information on a radio link state of a first RAT. The information on the radio link state may include at least one of information indicating whether a corresponding flow can satisfy a required QoS (e.g., transmission rate, error rate, delay time, or the like) and information indicating the quality of the radio link (e.g., transmission rate, error rate, delay time, signal to interference and noise ratio (SINR), signal strength, or the like). The information on the radio link state may be received from a base station. For example, the information on the radio link state may include a notification message transmitted according to the notification control described above.

In operation 703, the server determines whether a condition for switching is satisfied. The condition for switching may be defined based on at least one of whether the required QoS is satisfied, currently available QoS, a RAT in use, and the states of other RATs. For example, the condition for switching may include the fact that the currently used RAT does not satisfy the required QoS. When the information on the radio link state received in operation 701 is transmitted in response to not satisfying the required QoS, it means that the reception of the information on the radio link state does not satisfy the requested QoS. In this case, the server may determine that the required QoS is not satisfied in response to the reception of the information on the radio rink state, and may determine switching to another RAT. Additionally, when the information on the radio link state includes information indicating the quality of the radio link, the server may determine switching to the other RAT based on a comparison result of the current QoS corresponding to the quality of the radio link and the required QoS.

When the condition for switching is satisfied, in operation 705, the server controls to switch the data path of the corresponding terminal to the second RAT. For example, the server commands the RAT switching to an object that controls the user plane. To this end, the server may generate a message requesting the RAT switching and transmit the message.

In the embodiment described with reference to FIG. 7, the server determines whether the condition for switching is satisfied based on the information on the radio link. A specific operation for determining whether the condition is satisfied may be variously defined.

According to an embodiment, the condition may be defined as an unsatisfactory of the required QoS and the existence of other available RATs. In this case, the server may determine that the RAT in use does not satisfy the required QoS and may determine whether to perform RAT switching in response to the presence of another available RAT.

According to another embodiment, the condition may be defined as unsatisfactory of the required QoS and the existence of another available RAT capable of satisfying the required QoS. In this case, the server may determine that the RAT in use does not satisfy the required QoS and may determine whether to perform RAT switching in response to satisfying the required QoS.

According to another embodiment, the condition may be defined as unsatisfactory of the required QoS and the amount of traffic less than a threshold. The required QoS may not be satisfied due to the congestion of the network as well as the degradation of the radio link. Therefore, if the required QoS cannot be satisfied despite the small amount of traffic, this can be treated as a problem on the radio link. Therefore, the server may determine that the RAT in use does not satisfy the required QoS and may determine whether to perform RAT switching in response to the fact that the amount of traffic in the RAN of the RAT in use is less than the threshold.

According to another embodiment, the condition may be defined as unsatisfactory of the required QoS and a difference between an available QoS greater than the threshold and the required QoS. If the degree of unsatisfactory is equal to or less than a certain level although the required QoS is not satisfied, the server may determine to continue to use the RAT in use. In this case, the server may determine that the RAT in use does not satisfy the required QoS and may determine whether to perform RAT switching in response to the fact that the difference between the available QoS and the required QoS exceeds the threshold.

Any one of the conditions according to the various embodiments described above may be used, or a combination of two or more conditions may be used. For example, the second condition and the third condition may be used together, the second condition and the fourth condition may be used together, the third condition and the fourth condition may be used together, or the second condition, the third condition, and the fourth condition may be used together.

In addition, according to another embodiment, the conditions or combinations of the conditions to be used may be adaptively changed depending on the situation. For example, if the frequency of RAT switching is desired to be lowered, the server can add conditions or adjust the threshold.

Under the various conditions described above, when there are multiple switchable RATs, selection of the RAT to be switched is required. According to various embodiments, the server may select a RAT according to a predefined priority, or may select one RAT based on a QoS level that can be provided. Specifically, when the RAT is selected based on the QoS level that can be provide, the server may select a RAT having a maximum available QoS level or a RAT having the most similar available QoS level while being higher than the required QoS.

Figure 8:
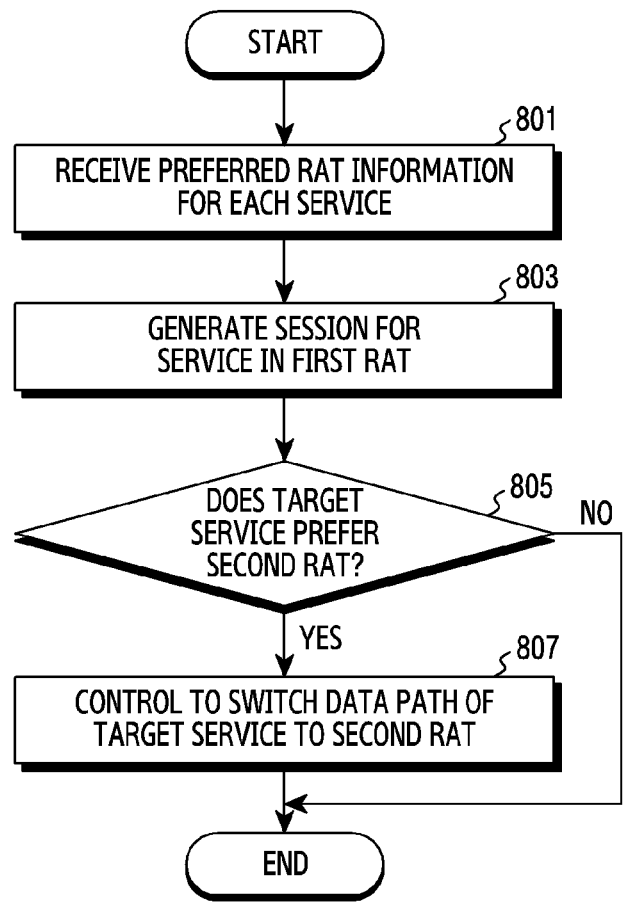
FIG. 8 is a flowchart illustrating switching based on a policy of a server that manages a session in a wireless communication system according to various embodiments of the disclosure.

FIG. 8 is a flowchart illustrating switching based on a policy of a server that manages a session in a wireless communication system according to various embodiments of the disclosure. FIG. 8 is an operation method of an apparatus performing the function of the SMF 236, and illustrates a case of determining whether to perform switching based on a predefined policy.

Referring to FIG. 8, in operation 801, the server receives information on a preferred RAT for each service. That is, available services correspond to at least one preferred RAT, and mapping information between the service and the RAT may be managed as policy information. In this case, the server may receive the information on the preferred RAT for each service from a PCF (e.g., PCF 238). The mapping between the service and the RAT may be defined identically for all terminals or may be differently defined for each terminal. For example, the mapping between the service and the RAT may be defined differently according to the user class of the terminal.

In operation 803, the server generates a session for a service in the first RAT. That is, the server may generate at least one session to provide a service to the terminal. For example, the server may select at least one network slice to provide a service, and may generate at least one session and at least one flow within the selected network slice.

In operation 805, the server confirms whether a target service prefers the second RAT. That is, the server may search for a service provided to the terminal from the information received in operation 801, and may confirm the RAT corresponding to the searched service, thereby identifying the preferred RAT of the target service. Accordingly, the server may determine whether the target service prefers the second RAT rather than the first RAT.

In operation 807, the server controls to switch the data path of the target service to the second RAT. For example, the server commands RAT switching to an object that controls the user plane. To this end, the server may generate a message requesting RAT switching and may transmit the message.

As in the embodiment described with reference to FIG. 8, the RAT switching may be performed based on the predefined policy. In the embodiment of FIG. 8, it has been illustrated that the preferred RAT is defined for each service. However, according to other embodiments, the preferred RAT may be defined for each network slice, for each session, or for each flow, not for each service. The preferred RAT for each service/network slice/session/flow can be understood as a classification of RATs according to the required QoS or the target QoS.

In the embodiment of FIG. 8, the server receives information on the preferred RAT for each service. However, according to another embodiment, the server does not receive the information on the preferred RAT for each service, may provide the information on the service/network slice/session/flow to an object (e.g., PCF) having the information on the preferred RAT for each service, and may receive a feedback on the preferred RAT.

Figure 9:
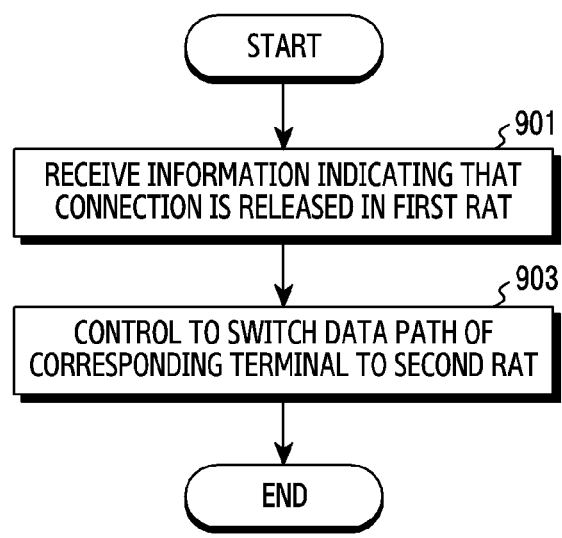
FIG. 9 is a flowchart illustrating switching based on a connection state of a server that manages a session in a wireless communication system according to various embodiments of the disclosure.

FIG. 9 is a flowchart illustrating switching based on a connection state of a server that manages a session in a wireless communication system according to various embodiments of the disclosure. FIG. 9 9 is an operation method of an apparatus performing the function of the SMF 236, and illustrates a case of determining whether to perform switching based on a connection state of a terminal.

Referring to FIG. 9, in operation 901, the server receives information indicating that the connection is released in the first RAT. For example, the release of the connection may occur due to a UE that experiences a radio link failure (RLF), a handover failure, or the like, or by a detach request. The server may receive the information on the connection state of the terminal from another object (e.g., AMF). For example, the server may receive information on a change in the connection state of the terminal through an event exposure service provided by an AMF.

In operation 903, the server controls to switch the data path of the terminal to the second RAT. For example, the server commands RAT switching to an object that controls a user plane. To this end, the server may generate a message requesting RAT switching and may transmit the message.

According to various embodiments described with reference to FIGS. 7 to 9 above, it is determined whether switching is performed by a server (e.g., the SMF 236) that manages a session. Accordingly, RAT switching may be performed without a separate signaling procedure, and when the first RAT is used, the terminal may operate in an idle mode in the second RAT.

According to another embodiment, it may be determined whether switching is performed by a terminal (e.g., the terminal 110). In this case, switching initiated in the server managing the above-described session, that is, a procedure used in core initiated switching may be utilized. Hereinafter, an embodiment in which switching is performed by the terminal is determined will be described.

Figure 10:
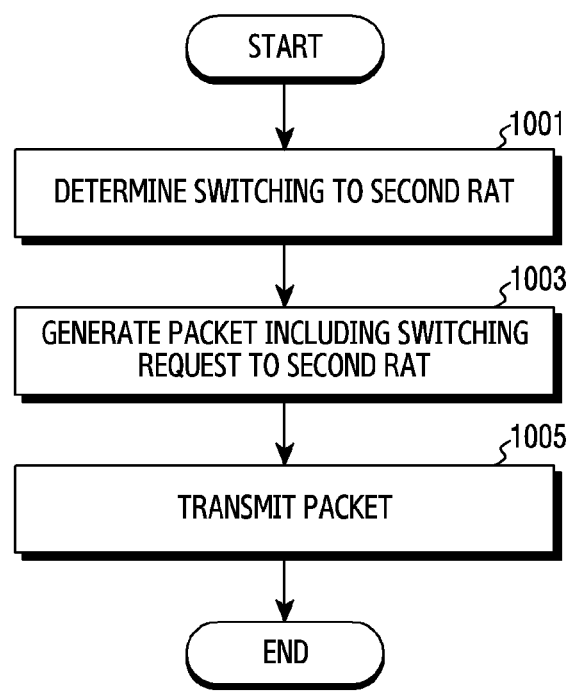
FIG. 10 is a flowchart illustrating the operation of a terminal in a wireless communication system according to various embodiments of the disclosure.

FIG. 10 is a flowchart illustrating the operation of a terminal in a wireless communication system according to various embodiments of the disclosure. FIG. 10 illustrates an operation method of the terminal 110.

Referring to FIG. 10, in operation 1001, the terminal determines switching to the second RAT. For example, the terminal may determine switching from the first RAT to the second RAT based on the radio link state. Specifically, the terminal compares a value indicating the radio link state (e.g., transmission rate, error rate, delay time, SINR, signal strength, etc.) with a threshold value, and performs switching according to confirming that the comparison result satisfies a predefined condition. Here, the threshold may be applied differently depending on a service provided to the terminal. That is, the terminal may determine whether the current radio link quality state can satisfy the required QoS, and may determine switching to the second RAT in response to determining that the required QoS is not satisfied.

In operation 1003, the terminal generates a packet including a switching request to the second RAT. According to an embodiment, the packet including the switching request to the second RAT may include a data unit having a predefined format. For example, the predefined format may be defined by configuring at least one of a plurality of fields included in a header (e.g., IP address, port number, etc.) to a specific predefined value, or inserting a specific predefined bit pattern/value in at least a portion of a payload. According to another embodiment, the packet including the switching request to the second RAT may include a message (e.g., RRC message, MAC control element (MAC CE), or uplink control information (UCI)) defined to request RAT switching.

In operation 1005, the terminal transmits the packet including the switching request to the second RAT. For example, the terminal may transmit the packet through a default Internet access point name (APN). The packet transmitted from the terminal is received by the base station through a radio channel, and is transmitted to an object (e.g., GW, UPF, etc.) that processes the user plane of the first RAT.

As in the embodiment described with reference to FIG. 10, the terminal may transmit the switching request. At this time, when the terminal in the RAT to be switched (e.g., the second RAT) is in the idle state, the terminal may first perform an operation for transitioning to the connected state. For example, the terminal may transition to the connected state by transmitting a service request.

Figure 11:
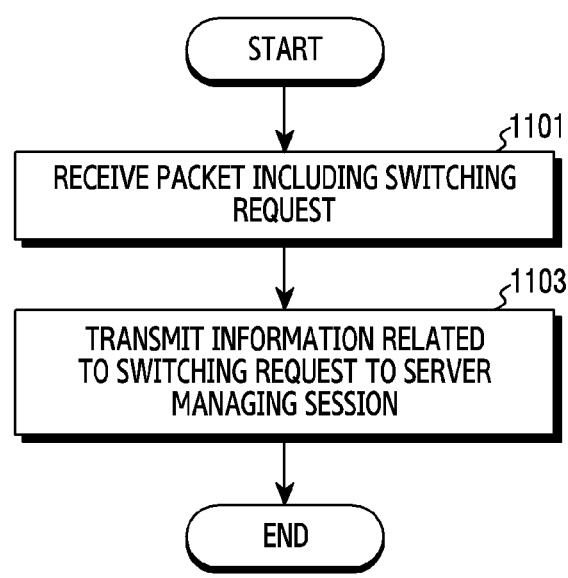
FIG. 11 is a flowchart illustrating the operation of a server that manages a UP in a wireless communication system according to various embodiments of the disclosure.

FIG. 11 is a flowchart illustrating switching based on a request of a terminal of a server that manages a user plane in a wireless communication system according to various embodiments of the disclosure. FIG. 11 illustrates an operation method of an apparatus performing the function of the UPF.

Referring to FIG. 11, in operation 1101, the server receives a packet including a switching request. According to an embodiment, the packet including the switching request to the second RAT may include a data unit having a predefined format. For example, the predefined format may be defined by configuring at least one of a plurality of fields included in a header (e.g., IP address, port number, etc.) to a specific predefined value, or inserting a specific predefined bit pattern/value in at least a portion of a payload. In this case, the server may classify, parse, or identify the packet including the switching request by confirming at least one field set to a specific predefined value in the header, or confirming a specific predefined bit pattern/value at a specific location in the payload.

In operation 1103, the server transmits information related to the switching request to the server managing the session (e.g., the SMF 236). The server that identifies the packet including the switching request recognizes that the switching request has occurred from the terminal, and transmits information related to the switching request to the server managing the session. That is, the server may transmit at least one of the information indicating that the switching request has occurred and information on a terminal requesting switching.

As in the embodiment described with reference to FIG. 11, the server managing the user plane may receive the switching request of the terminal. As the information related to the switching request is transmitted to the server managing the session, the server managing the session may determine to perform the switching and transmit a message indicating the RAT switching. That is, the server processing the user plane in the core may receive a packet including a specific value (e.g., a specific IP address, a specific port number, a specific data, etc.) and may transmit the received packet to the state monitoring unit (e.g., the state monitoring unit 432) of the server managing the session, and the server managing the session may update the related information and may determine RAT switching. Accordingly, the server managing the user plane may switch the data path of the terminal to the second RAT.

According to another embodiment, the server that has confirmed the switching request may switch the data path of the terminal to the second RAT without transmitting information related to the switching request to the server managing the session. Thereafter, additionally, the server may transmit information indicating that the data path of the terminal is switched to the second RAT to the server managing the session.

As in the embodiment described with reference to FIGS. 10 and 11, the terminal transmits the switching request by transmitting the data unit having the predefined format. At this time, the predefined format may be used to indicate a service/session/flow to be switched, in addition to being used to inform the switching request. That is, the data unit in the predefined format may include a value corresponding to a switching request and a value for indicating a service/session/flow to be switched. Additionally, the data unit of the predefined format may further include a value indicating the RAT to be switched.

As in the embodiment described with reference to FIGS. 10 and 11, whether to perform switching may be determined by the terminal. The embodiments described with reference to FIGS. 10 and 11 may be implemented in parallel with the embodiments described with reference to FIGS. 7 to 9. That is, even in conjunction with UE-initiated switching, the core may perform switching according to information collected by the RAN or its own determination regardless of receiving a switching request from the terminal.

Figure 12A:
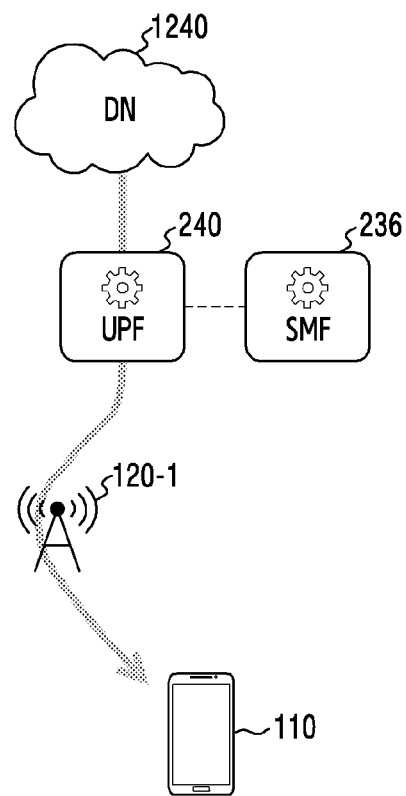
FIGS. 12A to 12C illustrate specific examples of RAT switching procedures in a wireless communication system according to various embodiments of the disclosure.
Figure 12B:
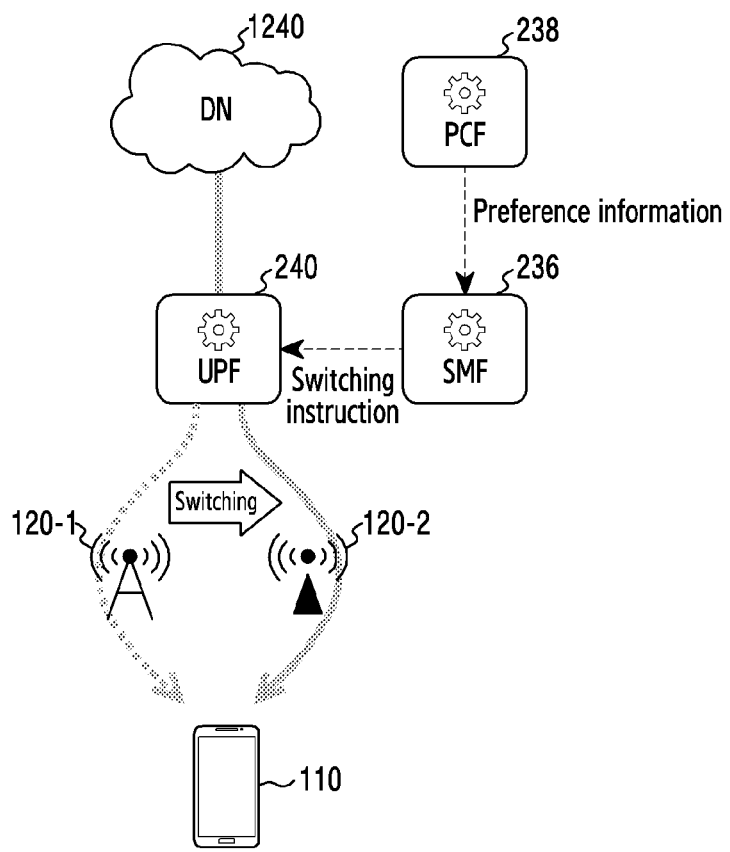
Figure 12C:
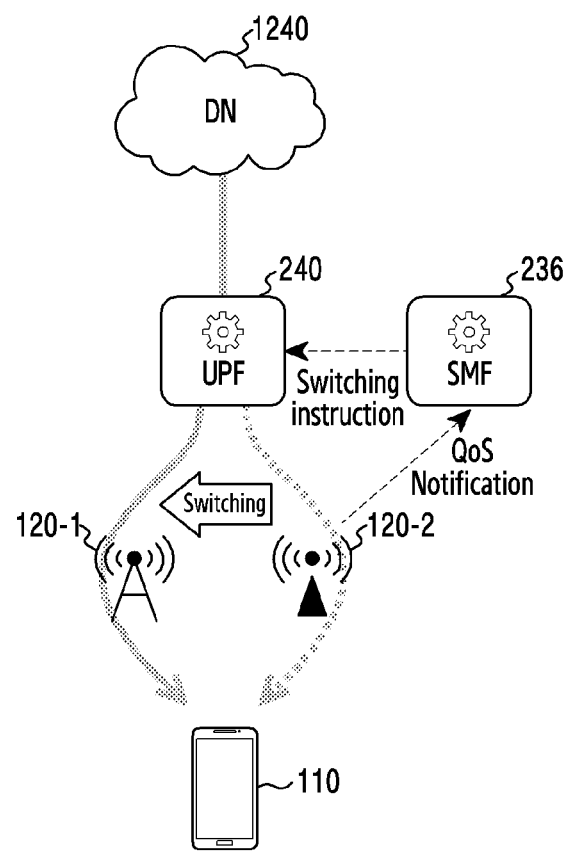

Hereinafter, specific examples of RAT switching will be described with reference to FIGS. 12A to 12C. FIGS. 12A to 12C illustrate specific examples of RAT switching procedures in a wireless communication system according to various embodiments of the disclosure.

Referring to FIG. 12A, the terminal 110 is attached to the 4G system. That is, the terminal 110 accesses the 4G system by performing random access to the base station 120-1 and performing necessary procedures (e.g., capability negotiation, registration, connection establishment, etc.). Accordingly, the terminal 110 is connected to a data network (DN) 1240 through the UPF 240 in the core. Here, the UPF 240 may serve as the GW of the 4G system. When the terminal is connected to the core through the first 4G system, the state monitoring unit 432 of the SMF 236 registers only the 4G system as an available RAT. Since the available RAT is a single path, data to the terminal 110 is transmitted through the 4G system.

Referring to FIG. 12B, the terminal 110 is attached to the 5G system. That is, the terminal 110 discovers the cell of the base station 120-2, and then performs necessary procedures (e.g., random access, capability negotiation, registration, connection establishment, etc.) to access the 5G system through the base station 120-2. Accordingly, the terminal 110 has two available RATs. At this time, if the 5G system is selected for the reason that a service being provided prefers the 5G system, the data path of the terminal 110 may be switched to the 5G system. To this end, the SMF 236 may receive preference information from the PCF 238, may determine RAT switching according to the preference information, and may instruct switching to the UPF 240.

Referring to FIG. 12C, the core determines switching to the 4G system while the terminal 110 is using the service through the 5G system. For example, an object in the core (e.g., the SMF 236) may receive information indicating that the QoS is not satisfied from the RAN of the 5G system, and may determine switching again to the 4G system based on the received information, that is, 4G fallback. Accordingly, the SMF 236 may instruct switching to the 4G system to the UPF 240. After the switching, if the terminal for the 4G system is in the idle state, the core performs paging in the 4G system and then transmits data.

Figure 13:
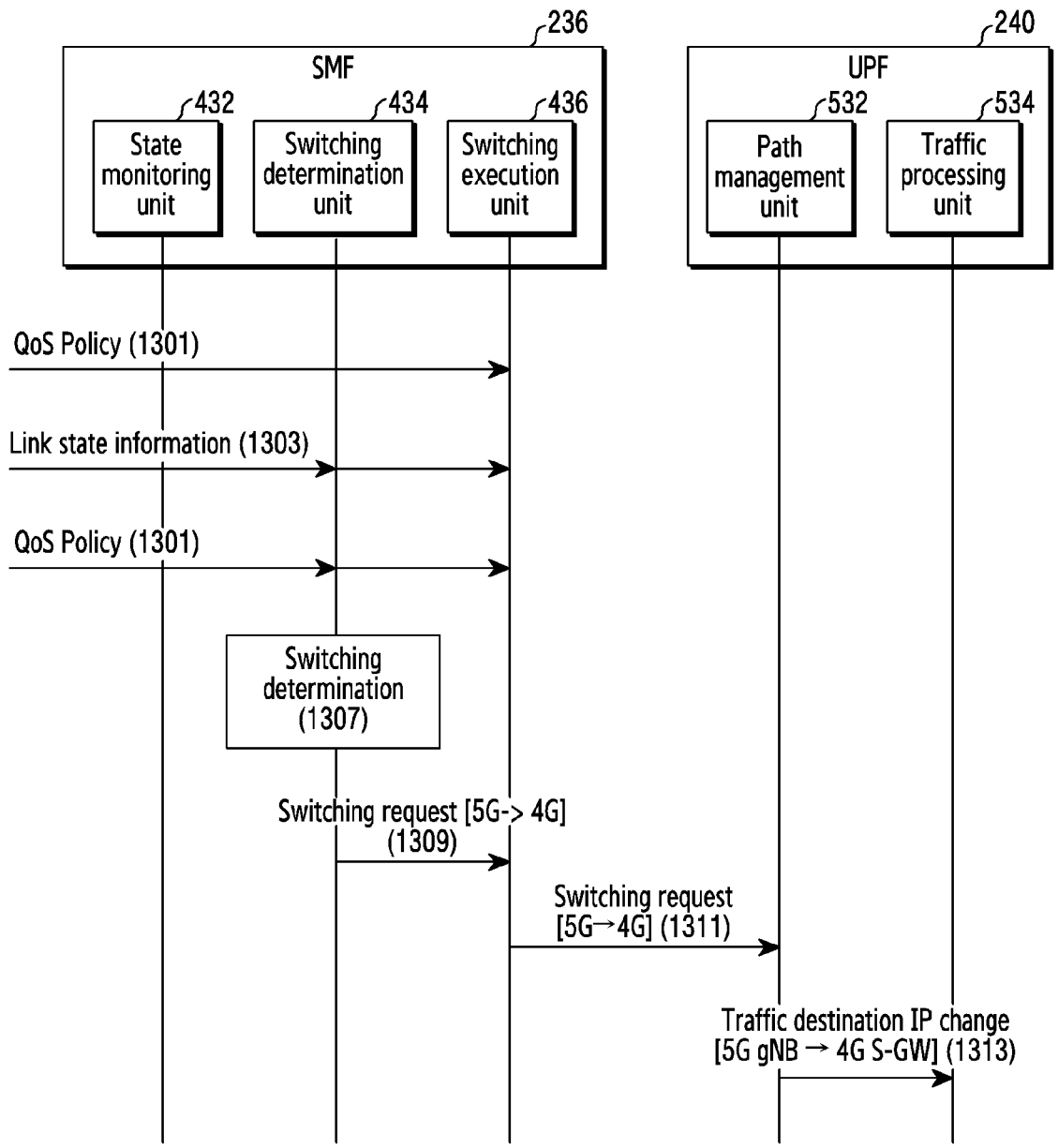
FIG. 13 illustrates a signal exchange diagram for RAT switching in a wireless communication system according to various embodiments of the disclosure.

According to various embodiments described above, switching between different RATs may be performed. For switching between the RATs, at least one control message in the core may be transmitted/received between objects. FIG. 13 illustrates an example of signaling for RAT switching. FIG. 13 illustrates a signal exchange diagram for RAT switching in a wireless communication system according to various embodiments of the disclosure.

Referring to FIG. 13, in operation 1301, the switching determination unit 434 of the SMF 236 receives a QoS policy. In operation 1303, the switching determination unit 434 of the SMF 236 receives link state information through the state monitoring unit 432. In operation 1305, the switching determination unit 434 of the SMF 236 receives a QoS notification through the state monitoring unit 432. The order of operations 1301, 1303, and 1305 may be changed, and at least some of operations 1301, 1303, and 1305 may be omitted.

In operation 1307, the switching determination unit 434 of the SMF 236 determines to perform switching. To this end, the switching determination unit 434 may use a QoS policy, link state information, QoS notification, and the like. At this time, the switching determination unit 434 may determine switching of all services/slices/sessions/flows of the corresponding terminal, or may determine switching of some services/slices/sessions/flows.

In operation 1309, the switching determination unit 434 transmits a switching request to the switching execution unit 436. For example, the switching request may indicate switching from the 5G system to the 4G system. In operation 1311, the switching execution unit 436 transmits a switching request message to the path management unit 532 of the UPF 240. For example, the switching request message may request switching from the 5G system to the 4G system. Accordingly, in operation 1313, the path management unit 532 requests the traffic processing unit 534 to change the IP address of the traffic destination of the corresponding terminal. For example, the path management unit 532 requests the traffic processing unit 534 to change the traffic destination of the corresponding terminal from a 5G gNB to a 4G S-GW. Accordingly, the data path of the terminal may be changed from the 5G system to the 4G system.

As the data path changes, the terminal may receive/transmit data through the 4G base station. At this time, when the terminal is in the idle mode, the 4G system may allow the terminal to perform communication through the 4G system by performing paging for the terminal. When the terminal is not in the active mode, the 4G system may allow the terminal to perform communication through the 4G system by using downlink control information (DCI).

Although not illustrated in FIG. 13, additionally, the SMF 236 may transmit a control message informing the terminal of performing RAT switching. Such signaling can prevent an attempt to reconnect or re-enter an existing RAT of the terminal, that is, the 5G system.

According to various embodiments described above, switching between different RATs may be performed. In the various embodiments described above, the 4G system and the 5G system have been presented as examples of RATs, but the various embodiments are also applicable to switching between a non-3GPP system and a 3GPP system such as a wireless local area network (WLAN). For example, in the case of a service that prefers a wireless LAN, it may be determined to switch from a 3GPP system to a WLAN immediately after the wireless LAN is connected. Alternatively, when the core identifies a problem with the radio channel by receiving link information in the 3GPP RAN while a 3GPP system is used, switching to WLAN may be determined. As another embodiment, when a WLAN access point (AP) can provide radio state information or QoS information for a corresponding terminal to the core, the core may determine switching from the WLAN to the 3GPP system based on the provided information. When switching to a non-3GPP system such as WLAN, when the terminal is in an idle or power saving mode for the system, a separate downlink inband packet may be transmitted to wake the terminal.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method performed by a session management function (SMF) in a wireless communication system, the method comprising:
  receiving, from a base station, a quality of service (QoS) notification message wherein the QoS notification message includes information indicating that a QoS flow of the base station and a terminal does not satisfy a guaranteed flow bit rate (GFBR);
  determining whether to switch a core network providing a service to a terminal from a $5^{th}$ generation core (5GC) to an evolved pocket core (EPC) based on the QoS notification message;
  in case that the core network is switched from the 5GC to the EPC, generating a message indicating to switch the core network from the 5GC to the EPC;
  transmitting, to a user plane function (UPF), the message indicating to switch the core network from the 5GC to the EPC; and
  transmitting, to the terminal, a control message indicating that the core network is switched from the 5GC to the EPC.

2. The method of claim 1, further comprising:
  receiving at least one of information on a preferred core network for each service from a policy control function (PCF) or information on a connection state of 5GC from an access and mobility management function (AMF).

3. The method of claim 2, wherein the determining of whether to switch the core network for providing the service from the 5GC to the EPC further comprises:
  generating a session for a service on the 5GC;
  identifying whether a preferred core network of the service is the EPC, based on information on a preferred core network for each service; and
  determining to switch the core network for providing the service from the 5GC to the EPC, when the preferred core network of the service is the EPC.

4. The method of claim 2, wherein the determining of whether to switch the core network for providing the service from the 5GC to the EPC comprises:
  receiving information indicating that a connection is released from the 5GC, based on the information on a connection state of 5GC; and
  determining to switch the core network providing the service from the 5GC to the EPC, when the connection of the terminal is released from the 5GC.

5. The method of claim 1, wherein the QoS notification message includes at least one of information indicating whether a flow of the terminal satisfy the QoS flow or information indicating a radio link quality of the terminal.

6. The method of claim 1, wherein the determining of whether to switch the core network for providing the service from the 5GC to the EPC further comprises:
  determining to switch the core network for providing the service from the 5GC to the EPC, when a flow of the terminal does not satisfy the QoS required by the service and the EPC is available.

7. The method of claim 1, wherein the determining of whether to switch the core network for providing the service from the 5GC to the EPC further comprises:
  determining to switch the core network for providing the service from the 5GC to the EPC, when a flow of the terminal does not satisfy the QoS required by the service, the EPC is available, and an amount of traffic of the 5GC is equal to or less than a threshold.

8. The method of claim 1, wherein the determining of whether to switch the core network for providing the service from the 5GC to the EPC further comprises:
  determining to switch the core network for providing the service from the 5GC to the EPC, when a flow of the terminal does not satisfy the QoS required by the service and a difference between the required QoS and an available QoS exceeds a threshold.

9. The method of claim 1, further comprising:
  receiving, from the UPF, switching request information, wherein the switching request information is generated based on a core network switching request identified by the terminal.

10. The method of claim 9, wherein the determining of whether to switch the core network for providing the service from the 5GC to the EPC comprises:
  identifying whether to switch the core network for providing the service from the 5GC to the EPC, based on the switching request information.

11. A session management function (SMF) in a wireless communication system, the SMF comprising:
  a transceiver configured to transmit and receive a signal; and
  at least one processor operably coupled to the transceiver, wherein the at least one processor is configured to:
    receive, from a base station, a quality of service (QoS) notification message, wherein the QoS notification message includes information indicating that a QoS flow of the base station and a terminal does not satisfy a guaranteed flow bit rate (GFBR);
    determine whether to switch a core network providing a service to the terminal from a 5th generation core (5GC) to an evolved pocket core (EPC) based on the QoS notification message;
    in case that the core network is switched from the 5GC to the EPC, generate a message indicating to switch the core network from the 5GC to the EPC;
    transmit, to a user plane function (UPF), the message indicating to switch the core network from the 5GC to the EPC; and
    transmit, to the terminal, a control message indicating that the core network is switched from the 5GC to the EPC.

12. The SMF of claim 11, wherein the at least one processor is further configured to:
  receive at least one of information on a preferred core network for each service from a policy control function (PCF) or information on a connection state of 5GC from an access and mobility management function (AMF).

13. The SMF of claim 12, wherein the QoS notification message includes at least one of information indicating whether a flow of the terminal satisfy the QoS flow or information indicating a radio link quality of the terminal.

14. The SMF of claim 12, wherein the at least one processor is further configured to:
  generate a session for a service on the 5GC, identify whether a preferred core network of the service is the EPC, based on information on a preferred core network for each service, and determine to switch the core network for providing the service from the 5GC to the EPC, when the preferred core network of the service is the EPC.

15. The SMF of claim 12, wherein the at least one processor is further configured to:

receiving information indicating that a connection is released from the 5GC, based on the information on a connection state of 5GC, determine to switch the core network for providing the service from the 5GC to the EPC, when the connection of the terminal is released from the 5GC.

16. The SMF of claim 11, wherein the at least one processor is further configured to:

determine to switch the core network for providing the service from the 5GC to the EPC, when a flow of the terminal does not satisfy the QoS required by the service and the EPC is available.

17. The SMF of claim 11, wherein the at least one processor is further configured to:

determine to switch the core network for providing the service from the 5GC to the EPC, when a flow of the terminal does not satisfy the QoS required by the service, the EPC is available, and an amount of traffic of the 5GC is equal to or less than a threshold.

18. The SMF of claim 11, wherein the at least one processor is further configured to:

determine to switch the core network for providing the service from the 5GC to the EPC, when a flow of the terminal does not satisfy the QoS required by the service and a difference between the required QoS and an available QoS exceeds a threshold.

19. The SMF of claim 11, wherein the at least one processor is further configured to:

receive, from the UPF, switching request information, wherein the switching request information is generated based on a core network switching request identified by the terminal.

20. The SMF of claim 19, wherein the at least one processor is further configured to:

identify whether to switch the core network for providing the service from the 5GC to the EPC, based on the switching request information.

* * * * *